United States Patent
Ji et al.

(10) Patent No.: US 11,132,542 B2
(45) Date of Patent: Sep. 28, 2021

(54) TIME-SPACE DE-NOISING FOR DISTRIBUTED SENSORS

(71) Applicant: NEC Laboratories America, Inc., Princeton, NJ (US)

(72) Inventors: Philip Nan Ji, Cranbury, NJ (US); Shuji Murakami, Monmouth Junction, NJ (US); Giovanni Milione, Franklin Square, NY (US); Ting Wang, West Windsor, NJ (US)

(73) Assignee: NEC Corporation

( * ) Notice: Subject to any disclaimer, the term of this patent is extended or adjusted under 35 U.S.C. 154(b) by 153 days.

(21) Appl. No.: 16/455,009

(22) Filed: Jun. 27, 2019

(65) Prior Publication Data

US 2020/0005036 A1    Jan. 2, 2020

Related U.S. Application Data

(60) Provisional application No. 62/691,165, filed on Jun. 28, 2018.

(51) Int. Cl.
*G06K 9/00* (2006.01)
*G01N 23/203* (2006.01)
*G06T 5/00* (2006.01)
*G06K 9/40* (2006.01)

(52) U.S. Cl.
CPC ....... *G06K 9/00516* (2013.01); *G01N 23/203* (2013.01); *G06K 9/00523* (2013.01); *G06K 9/40* (2013.01); *G06T 5/002* (2013.01)

(58) Field of Classification Search
CPC .. G06K 9/00516; G06K 9/00523; G06K 9/40; G06T 5/002; G01N 23/203; G01D 3/02; G01D 5/35358
See application file for complete search history.

(56) References Cited

U.S. PATENT DOCUMENTS

| | | | |
|---|---|---|---|
| 2009/0136146 A1* | 5/2009 | Kaino | H04N 19/51 382/236 |
| 2016/0098820 A1* | 4/2016 | Rousselle | G06T 5/002 345/426 |
| 2018/0087372 A1 | 3/2018 | Stokely et al. | |

* cited by examiner

*Primary Examiner* — John W Lee
(74) *Attorney, Agent, or Firm* — Joseph Kolodka

(57) ABSTRACT

Aspects of the present disclosure describe systems, methods and structures employing time-space de-noising for distributed sensor.

1 Claim, 9 Drawing Sheets

```
┌─────────────────────────────────────────────────────────────────┐
│ Obtain the original waterfall plot of the distributed sensor,   │
│ where the range of x is from $x_1$ to $x_I$, and range of y     │
│ is from $t_1$ to $t_J$                                          │
└─────────────────────────────────────────────────────────────────┘
                              ↓
┌─────────────────────────────────────────────────────────────────┐
│ Set up 2-dimensional loop to select every points within the     │
│ range of: x from $x_1 + \frac{\Delta x}{2}$ to $x_I - \frac{\Delta x}{2}$, t from $t_{l_1} + \frac{\Delta t}{2}$ to $t_J - \frac{\Delta t}{2}$ │
└─────────────────────────────────────────────────────────────────┘
                              ↓
┌─────────────────────────────────────────────────────────────────┐
│ For each selected point $(x_{k_o}, t_{l_o})$, set a $\Delta x \times \Delta t$ virtual window with │
│ the selected point as the center, i.e. x from $x_{k_o} - \frac{\Delta x}{2}$ to $x_{k_o} + \frac{\Delta x}{2}$, │
│ t from $t_{l_o} - \frac{\Delta t}{2}$ to $t_{l_o} + \frac{\Delta t}{2}$ │
└─────────────────────────────────────────────────────────────────┘
                              ↓
┌─────────────────────────────────────────────────────────────────┐
│ Count the amount of pixels within the window that exceed the    │
│ threshold $W_{th}$ (called $p$), then get the percentage ratio  │
│ $r = p/(\Delta x \times \Delta t)$ for this window              │
└─────────────────────────────────────────────────────────────────┘
                              ↓
┌─────────────────────────────────────────────────────────────────┐
│ Generate a new waterfall plot using the $r$ values, which shows │
│ the 2-dimensional de-noised result                              │
└─────────────────────────────────────────────────────────────────┘
                              ↓
┌─────────────────────────────────────────────────────────────────┐
│ Further data processing (optional)                              │
└─────────────────────────────────────────────────────────────────┘
```

*FIG. 10*

TIME-SPACE DE-NOISING FOR DISTRIBUTED SENSORS

CROSS REFERENCE TO RELATED APPLICATIONS

This application claims the benefit of U.S. Provisional Patent Application Ser. No. 62/691,165 filed 28 Jun. 2018 the entire contents of which is incorporated by reference as if set forth at length herein.

TECHNICAL FIELD

This disclosure relates generally to distributed optical sensing systems, methods, and structures. More particularly, it describes systems, methods, and structures employing time-space de-noising for distributed sensors.

BACKGROUND

As is known in the optical sensing arts, distributed optical sensing systems have found widespread applicability in several useful applications such as integrity monitoring tools in process vessels, storage tanks, piping systems, and highway maintenance while offering operators tools to schedule maintenance programs and maximize service life. Distributed optical sensing offers high spatial & temporal profiling over large surfaces, long lengths, and at locations where conventional point sensing is not applicable or cost effective.

Despite such applicability, a number of implementation difficulties are known including noisy return signals that make some sensing difficult and error prone. Accordingly, systems, methods, and structures that mitigate or eliminate such signal noise related difficulties would represent a welcome addition to the art.

SUMMARY

An advance in the art is made according to aspects of the present disclosure directed to time-space de-noising for distributed sensors. In sharp contrast to the prior art, systems, methods, and structures according to aspects of the present disclosure employ de-noising that considers both time domain and space domain data in the distributed sensor.

Viewed from a first aspect, systems, methods, and structures according to aspects of the present disclosure perform statistical counting within a pre-set moving time-space window and—as a result—signal noise is advantageously and surprisingly reduced.

Viewed from another aspect, systems, methods, and structures according to aspects of the present disclosure provide physical diversity by considering signal(s) at neighboring locations along an optical fiber which advantageously improves a location accuracy of any alarms. Such alarms may be further improved by employing different percentage thresholds for the alarms such that different levels of alarm conditions can be distinguished.

Advantageously, systems, methods and structures according to aspects of the present disclosure may be applied in distributed sensor systems including distributed vibration sensors, distributed acoustic sensors, and distributed temperature sensors. By effectively reducing the noise, sensor data become "cleaner" and therefore better reflects physical phenomena and achieve better accuracy in alarm generation than possible by prior art systems, methods, and structures.

BRIEF DESCRIPTION OF THE DRAWING

A more complete understanding of the present disclosure may be realized by reference to the accompanying drawing in which:

FIG. 6(A) and FIG. 6(B) are examples illustrating counting of pixels exceeding the threshold in a de-noising process for: FIG. 6(A) Example 1, and FIG. 6(B): Example 2, according to aspects of the present disclosure;

FIG. 10 is a flow chart showing a de-noising procedure in offline operation according to aspects of the present disclosure.

Figure 1:
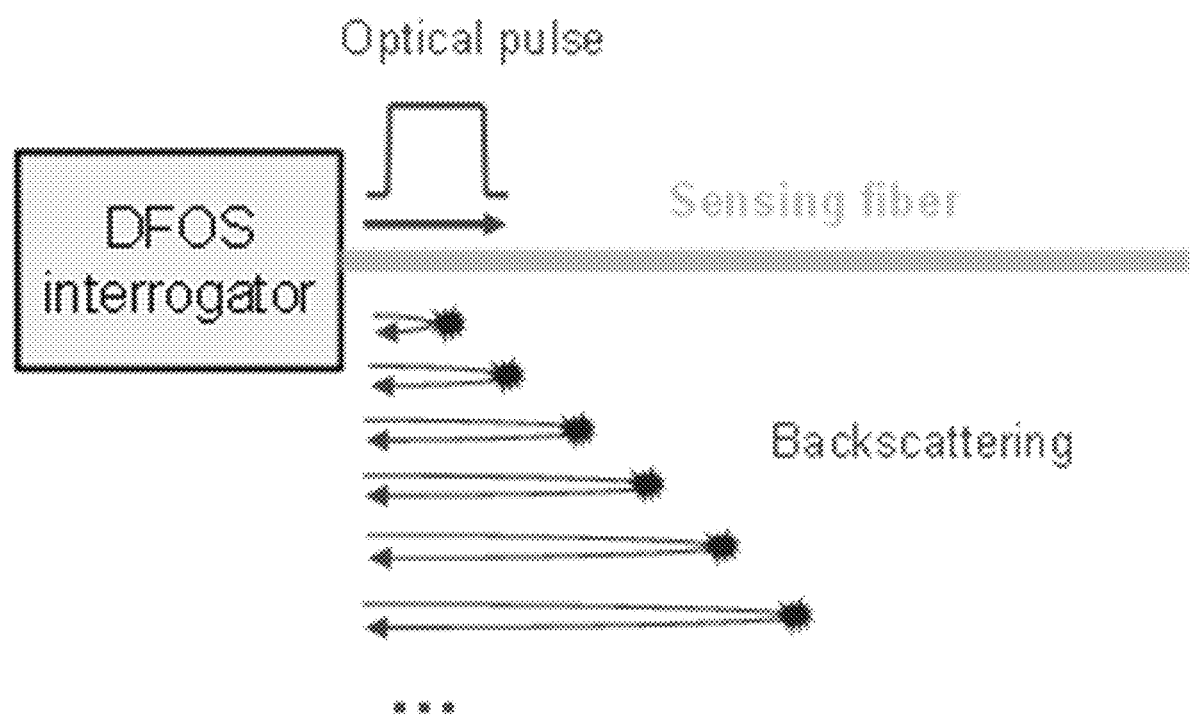
FIG. 1 is a schematic flow diagram illustrating principle (s) of back-scattering-based distributed optical fiber sensing according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed sensors are a type of sensor system that can detect physical parameters along the entire length of a sensing element. For example, distributed optical fiber sensor (DFOS) systems can monitor certain physical parameter(s), such as temperature, vibration, strain, etc. along the entire length of a sensing fiber continuously. Likewise, distributed radio frequency (RF) sensors can continuously monitor certain parameter(s) along an entire length of coaxial cable. Accordingly, distributed sensors and systems constructed therefrom have proven very useful for long distance, fine spatial resolution sensing—in sharp contrast to single-point sensors which can only measure one location, or array sensor which can only measure a fixed number of locations based on the number of sensor elements in the array. Given such utility, distributed sensors are being proposed and deployed in more and more applications ranging from perimeter security, oil/gas in-well monitoring, highway and other civil infrastructure monitoring, and natural disaster early warning, etc.

As is known, distributed sensing is a set of technologies that enables continuous, real-time measurements along an entire length of a fiber optic cable. Unlike traditional sensors and systems that rely on discrete sensors measuring at pre-determined points, distributed sensing does not employ manufactured sensors but utilizes the optical fiber. The optical fiber is the sensing element without any additional transducers in the optical path.

The interrogator operates according to a radar-style process—it sends a series of pulses into the fiber and records the return of the naturally occurring scattered signal as a function of time. In doing this, the distributed sensor measures at all points along the optical fiber.

Inasmuch as the fiber is the sensor, it is a cost-effective technology that can be easily deployed even in the harshest and most unusual environments. Some examples of distributed optical sensors include distributed temperature sensor (DTS), distributed vibration sensor (DVS), distributed acoustic sensor (DAS), and distributed temperature and strain sensor (DTSS), or combinations thereof. Most are based on the back-scattering phenomenon—in which a series of optical pulses are sent periodically by the sensor unit (interrogator) down the sensing fiber, and the variation of various types of back-scattering light (such as Rayleigh back-scattering, Brillouin back-scarring, and Raman back-scattering) of incident optical pulse are measured and processed to provide physical information such as temperature, strain, vibration, etc. along the optical fiber inside the sensing cable. FIG. 1 is a schematic flow diagram illustrating principle(s) of back-scattering-based distributed optical fiber sensing. Other distributed sensors use similar principles and mechanisms of operation.

In the back-scattering-based distributed sensors, the round-trip time-of-flight of received back-scattering light provides location information. By detecting the back-scattered light arriving at a photo-detector at a particular time, physical information relating to different locations along the entire fiber can be measured. Subsequent pulses provide physical information for the subsequent time, and so on. Accordingly, one can obtain physical information at continuous locations along the sensing fiber at continuous time(s).

Figure 2:
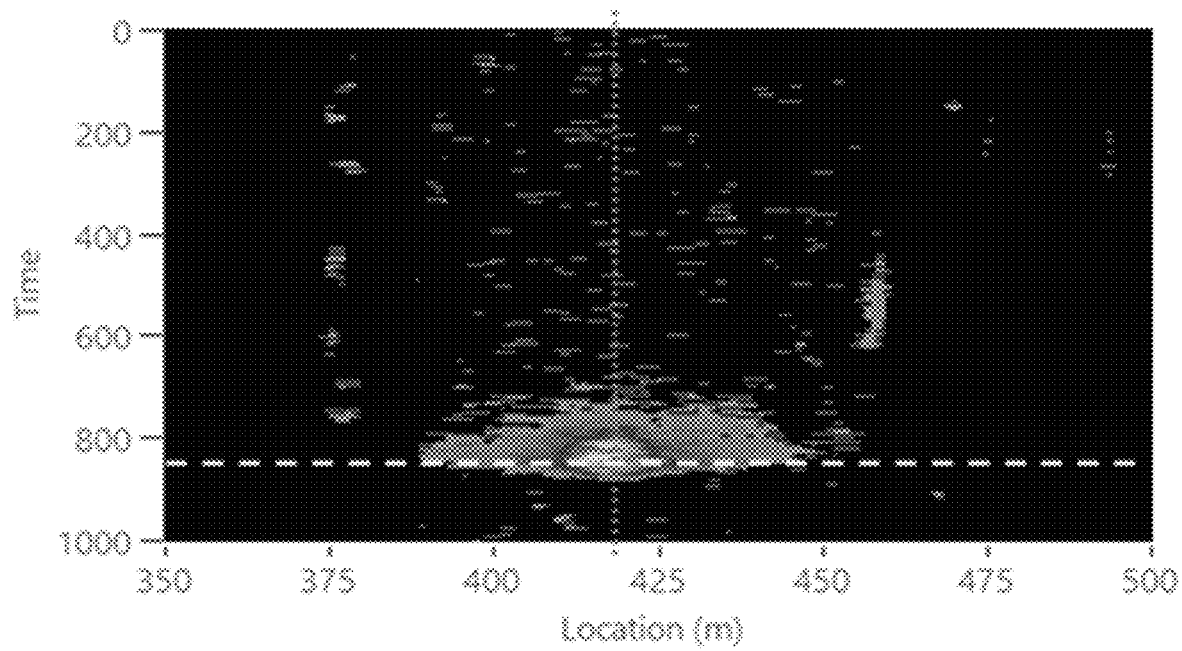
FIG. 2 is an illustrative waterfall plot from a distributed sensor according to aspects of the present disclosure.

FIG. 2 is an illustrative waterfall plot from a distributed sensor according to aspects of the present disclosure. As shown, it is a 3-dimensional plot wherein the x-axis is the location along the sensing cable, the y-axis is the time, and the z-axis is the value of the monitored physical parameters, such as vibration. In this illustrative plot, each horizontal line represents the vibration at that instant along the entire sensing cable, and each vertical line shows the time variation of the physical parameter at the corresponding location. This kind of plot is usually called the "waterfall" plot in the art, since the x-axis is usually fixed over time, while the y-axis scrolls down as time progresses. Since y axis described the time information, it can also be called the t-axis.

Figure 3:
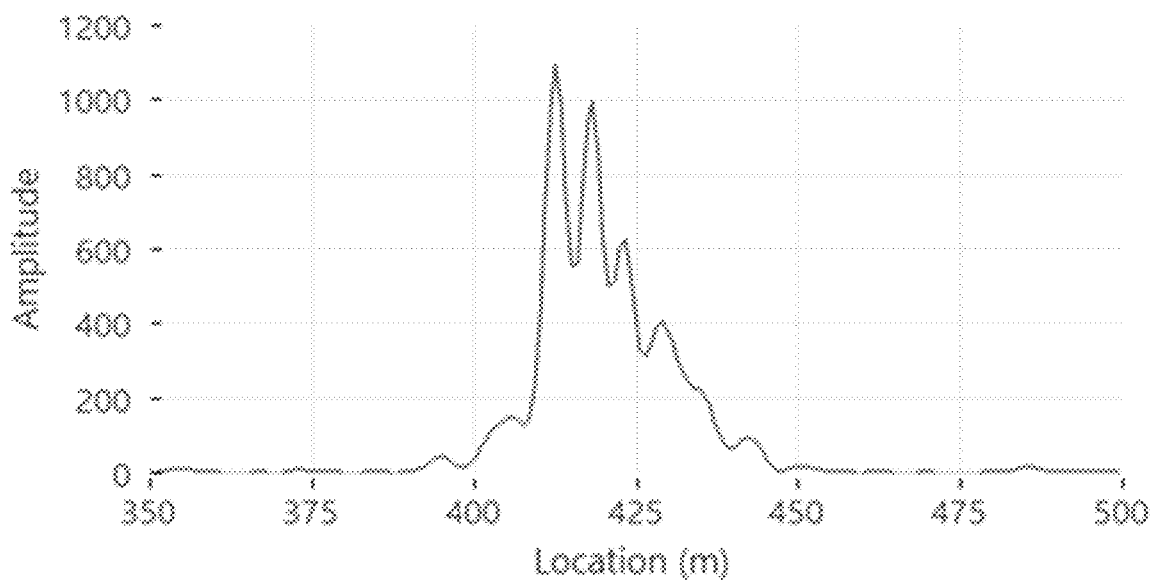
FIG. 3 is a plot of an illustrative example of distributed sensor data at one instant of time along an optical fiber according to aspects of the present disclosure.

As described above, each horizontal line is the vibration at one instant along the entire cable. FIG. 3 is an illustrative waterfall plot from a distributed sensor according to aspects of the present disclosure. More specifically, FIG. 3 shows an example of vibrations at time 850 (arbitrary unit) on FIG. 2. As may be observed, it is quite close to the event peak however, it may be observed that it is quite noisy, and no clear event location can be identified.

Figure 4:
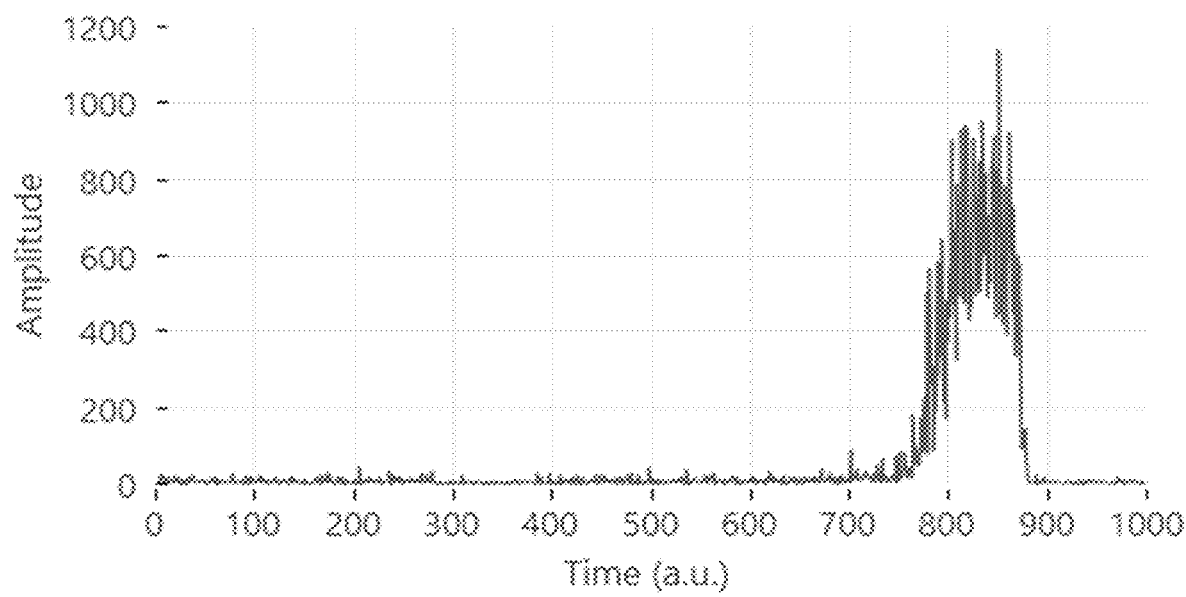
FIG. 4 is a plot of an illustrative example of distributed sensor data at one instant of time along an optical fiber according to aspects of the present disclosure.

Similarly, each vertical line shows the vibration at location on the cable over a period of measurement time. FIG. 4 is a plot of an illustrative example of distributed sensor data at one instant of time along an optical fiber according to aspects of the present disclosure. More particularly, FIG. 4 shows an example vibration at 420$m$ location on FIG. 2. The right side of the x-axis (larger value) is the earlier event, and the left side (smaller value) is the later event. Once again—by inspection—it may be observed that the selected location is also quite close to the peak however, it too is very noisy such that no smooth profile can be identified.

As those skilled in the art will readily appreciate, this type of sensor is usually very sensitive. For example, in the Rayleigh back-scattering-based distributed vibration sensor, a slight change of environment—such as a light touch on the sensing cable—can create sufficient path length change in the fiber—relating to reflective index change, cable elongation, etc.—which varies the interference of light inside the section of the fiber so touched and leads to intensity or phase variation in the back-scattered light. Accordingly, this technology can be used for—and has found widespread application of—perimeter intrusion detection over a long distance of cable as it can provide the exact location of a contact/touch event. In such application, the sensor data—e.g. the waterfall data—are further processed to generate alarm information such as "intrusion event happens at location x".

In an ideal case, if there's no anomaly (such as an intrusion event) at one location, the sensor output for that location at that time is 0. If there is vibration caused by an intrusion event, the result will be—for example—a positive number, proportional to the strength of the mechanical movement. Consequently—and advantageously—a threshold value for the measured vibration may be set. If the sensor data is above the threshold, an intrusion event is counted for the corresponding location at a corresponding moment of time. If the sensor data is below the set threshold, it is considered background and no intrusion event is reported.

As noted previously and as will be readily understood and appreciated by those skilled in the art, in real-world operation there are "noises" in the sensor results. One main source of such noise is the environment in which the distributed sensor is located. Since these sensors are so sensitive, environmental noise can be easily experienced and subsequently mixed with a useful signal.

For example, a certain velocity of wind affecting the optical fiber may cause the optical sensing cable to move or swing, which can be easily sensed by the distributed vibration sensor and generate an intrusion alarm. Other examples of alarm caused by an innocent environment source include animal movement (e.g. a bird landing on the fence), plant movement (e.g. tree branch touching the fence), ground movement, underground water flow, environmental temperature variation, etc. Of course, if one actually wanted to detect such environmental and/or animal interactions with the distributed sensor optical fiber, these technologies are sensitive enough to permit such detection.

As may be further appreciated, there also exist noises resulting from operation of the sensor hardware, such as frequency instability of a source, amplified spontaneous emission (ASE) of an amplifier, shot noise and thermal noise of photodetectors, and quantization noise of digitizers. As will be readily understood by those skilled in the art, these noises are also reflected in the processed sensor result.

We note at this point that two key parameters that determine the performance of the intrusion detection sensors are: (1) the probability of detection (POD), which should be as high as possible (ideal case POD=1); and (2) the nuisance alarm rate (NAR), where the "nuisance alarm" is defined as being an alarm on the sensor that is not attributable to an intrusion attempt, which is usually from the environment. Note that in some prior art publications, NAR is called "false alarm rate" or FAR. However, FAR is typically referred to a different parameter, where incorrect alarm is generated by the equipment itself due to factors such as poor design, inadequate maintenance, or component failure).

As described above, there are various factors causing noises in the distributed sensor results, which lower the POD and increase NAR. If the threshold is set too low, more nuisance alarms will be reported while no actual intrusion event occurs, causing the NAR to be high. On the other hand, if the threshold is set too high, some actual events will be missed, reducing the POD. Accordingly, a simple threshold is insufficient and ineffective.

Given these considerations, a key challenge in implementation of distributed sensors is to maximize the POD and minimize the NAR. Of course, one approach is to merely improve the overall system by reducing any noise produced by hardware employed. Notwithstanding its attractive simplicity however, such an approach may make the hardware too costly, and of course there exist theoretical limits to noise removal/mitigation efforts. Lastly, improving the hardware does not eliminate noise due to environmental considerations.

Given these, systems, methods and structures according to the present disclosure advantageously improve the noise characteristics (lower) by novel data processing techniques we employ for distributed sensors.

As will be appreciated, one data processing approach to improve noise in distributed sensors involves waiting for several consecutive alarms before deciding that an intrusion occurs. For example, the system can be set that if only single alarm condition is met (i.e. the sensor data is above the threshold), the alarm is ignored. Only if the sensor data exceed the threshold in 3 consecutive times at the similar location, the system will conclude that an alarm event occurs. Such approach reduces the nuisance alarm in a certain degree, because it uses time domain confirmation. However, its effectiveness is limited. It again depends on the threshold setting, and number of consecutive alarm count. If the count number is set too high, some short duration alarms might be missed. If it is set too low, nuisance alarms will still happen frequently.

Another approach involves performing a moving average operation on each time domain trace to smooth it out. This will reduce most of the fluctuations due to the noise, however, it also suppresses the peak value. Also, the performance depends on the smooth time duration setting. If it is too small, the improvement due to smoothing is limited. But if it is too large, some short duration events might be significantly reduced or even missed.

Yet another approach is to make the threshold variable, such as multiple threshold levels, or a dynamically adjustable threshold. In such system, another input source (e.g. a sensor or detector) is required to generate information to adjust the threshold. For example, a weather station is set up to measure the wind volume and direction, which is then used to set the intrusion alarm threshold. If it is very windy, the threshold can be set higher, so that the noisy data caused by the wind will be ignored. If there is little wind, the threshold can be set lower, so that fewer alarm cases will be missed. This method further reduces nuisance alarm caused by wind however, it cannot prevent nuisance alarm caused by other sources such as animal or underground movement. Also, it requires an additional sensor/detector.

Still another drawback to this approach is that the additional sensor/detector (e.g. weather station) only measures the local condition. Since distributed sensor is used to sense over a long distance (e.g. kilometers), the local condition might not apply to other location. More single location sensors will be needed, which further increase the cost and system complexity. Finally, a power source and communication channel for these sensors are also required—further adding to the cost.

Still another prior art method involves the adjustment of the threshold without using an additional sensor/detector. Here the time variation of the data at one location is split into several block durations, and the amount of data exceeding the threshold (which is called "level crossing" in this prior art) is counted. If it exceeds certain number (which is called "event threshold"), the alarm is generated. Also, the variation of level crossing count over the last noise detection duration is calculated. If it is less than the noise amplitude variation, the event threshold is updated. This method can dynamically adjust the threshold to reduce noise without requiring another sensor/detector. A limitation to this method however, is that it also only considers the time domain signal.

Advantageously, and in sharp contrast to these simple prior art methods, systems, methods, and structures according to the present disclosure employ a de-noising technique that utilizes waterfall data from the distributed sensor, which includes both time-domain and space-domain information, as shown in FIGS. 2-4.

During sensing operation, the data are constantly updated (rolling down the waterfall plot). We note that noise does not only occur over the time domain, but also over the spatial domain. Combined processing over both dimensions substantially improves de-noising.

It is noted that waterfall data can be represented as a 2-dimensional array $W(x_i, t_j)$, where $x_i=x_1, x_2, \ldots, x_I$ and $t_j=t_1, t_2, \ldots t_J$. $x_I$ and $t_J$ are the number of elements in the columns and rows of the waterfall, respectively.

Figure 5:
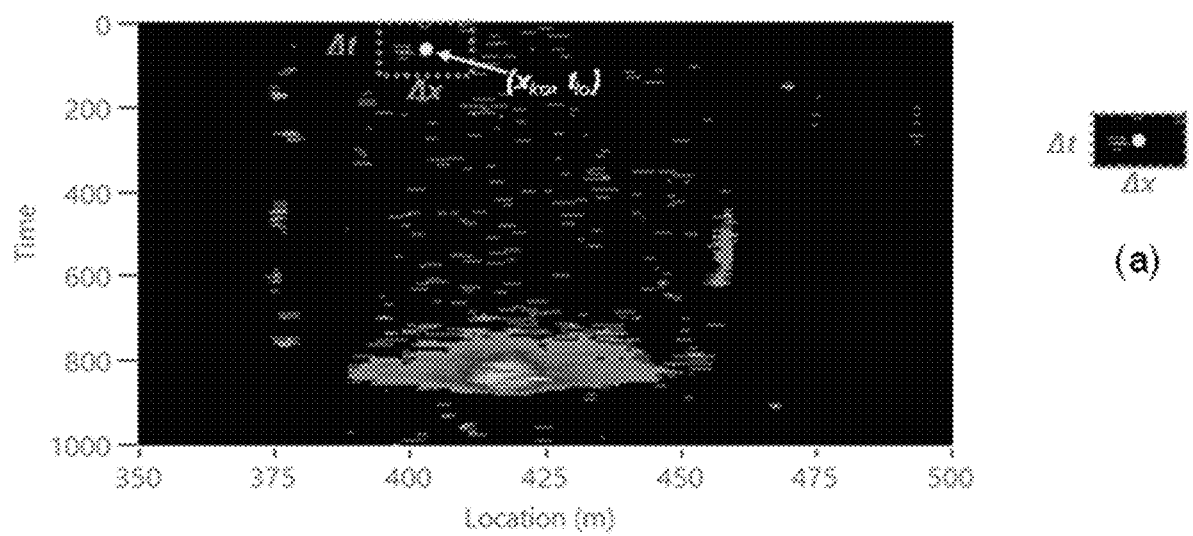
FIG. 5 is a plot illustrative of time-space de-noising procedure with inset example of one time-space window according to aspects of the present disclosure.

For each location at each time instant (i.e. one point on the waterfall plot, called "point-of-interest" or POI, such as the dot on FIG. 5), say $(x_{k_o}, t_{l_o})$, a virtual time-space window is selected, with $\Delta x$ points on the space domain (x-axis), and Δt points on the time domain (t-axis) and the POI ($x_{k_o}$, $t_{l_o}$) is at the center. The window is shown by the blue dashed box on FIG. 5 and as inset. Therefore, there are Δx×Δt pixels inside this window.

This window can be represented as $W(x_k, t_l)$, where $$x_k = x_{k_o} - \frac{\Delta x}{2}, \ldots, x_{k_o} + \frac{\Delta x}{2} \text{ and } t_l = t_{l_o} - \frac{\Delta t}{2}, \ldots, t_{l_o} + \frac{\Delta t}{2}.$$

Within this box, the amount of pixels with sensor data value (i.e. the z-axis value) exceeding the threshold (called $W_{th}$) is counted, say $p(x_{k_o}, t_{l_o})$. The minimum value of p is 0, meaning that none of the pixels within the window exceeds the threshold; and the maximum value of p is Δx×Δt, meaning that all pixels exceed the threshold. The ratio of p and the window size is then calculated to obtain the percentage ratio r for this POI. It can be expressed as:

$$r(x_{k_o}, t_{l_o}) = \sum_{x_k} \sum_{t_l} \frac{f(W(x_k, t_l))}{\Delta x \Delta t} \times 100\%$$

where $$f(W(x_k, t_l)) = \begin{cases} 1, & W(x_k, t_l) \geq W_{th} \\ 0, & W(x_k, t_l) < W_{th} \end{cases}$$

This ratio r is the called the de-noised value for this particular location at this particular time instant.

Figure 6A:
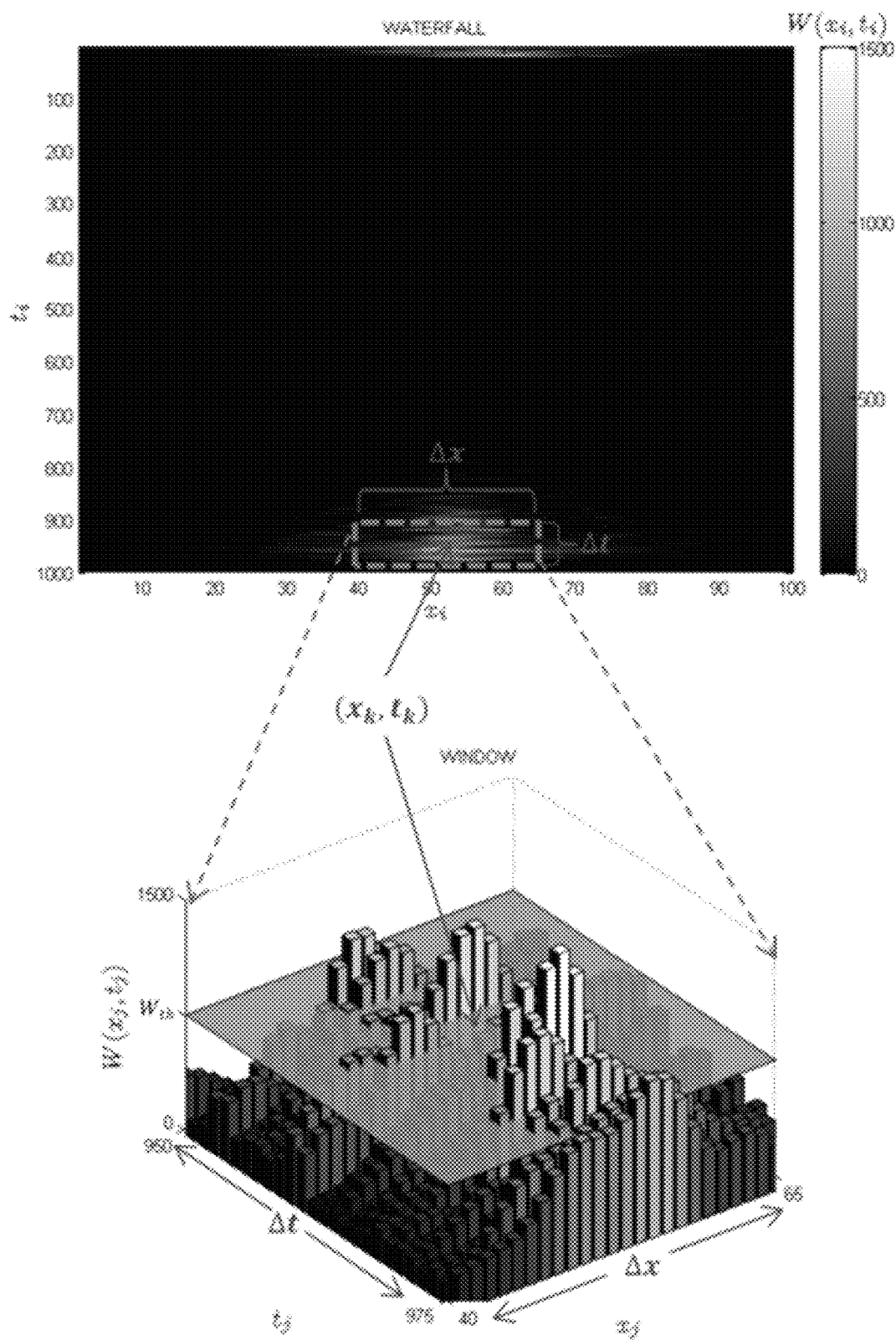
Figure 6B:
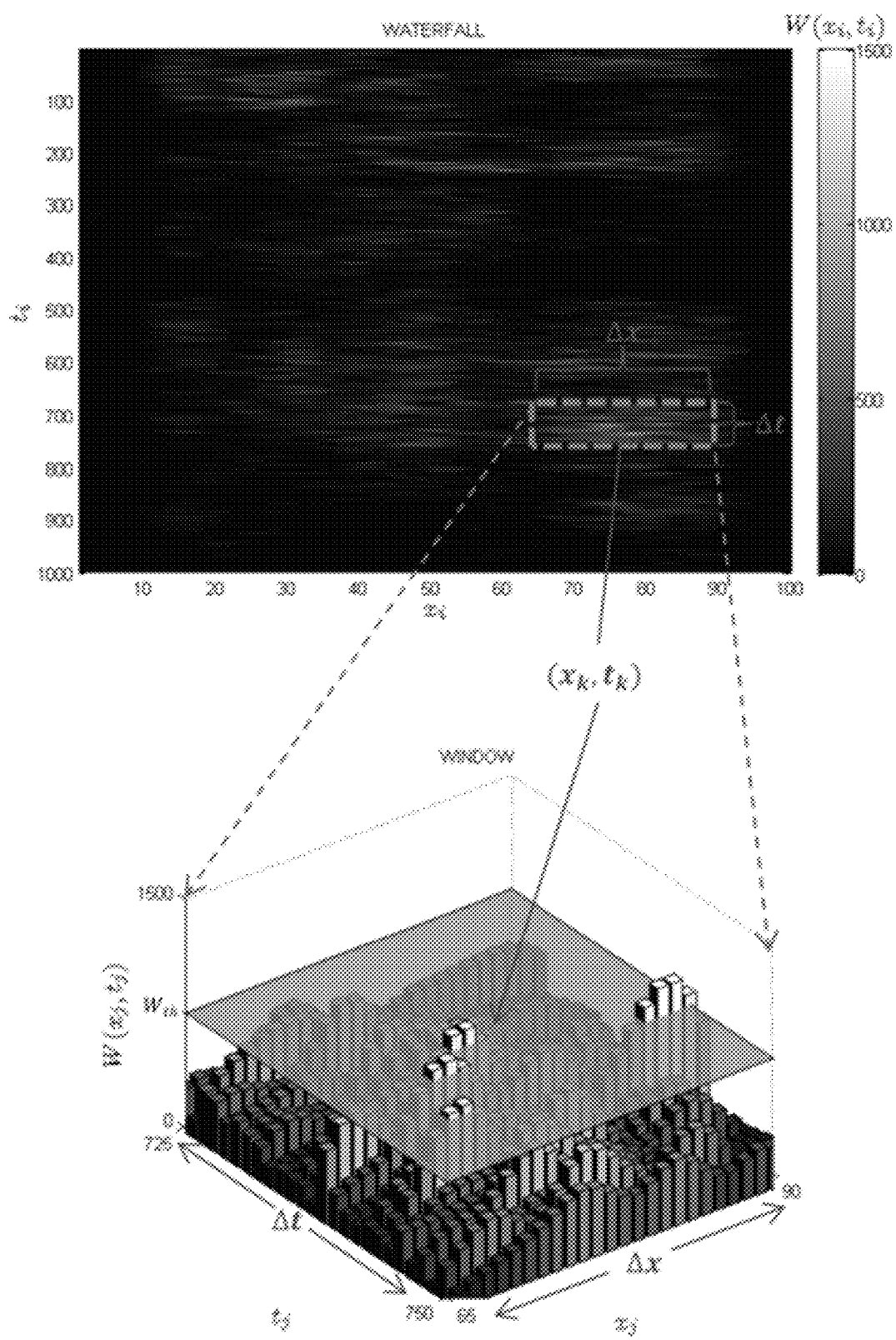

FIG. 6(A) and FIG. 6(B) each show an example of the process of counting the amount of pixels within the window that exceed the threshold. They are plotted in 3-dimensional graph to better illustrate the operation.

The procedure is performed for every pixel on the original waterfall plot (except some points at the edge, which will be discussed more later). After completing all these procedures, a new waterfall plot can be plotted, where the data (z-axis) are the r values.

Figure 7:
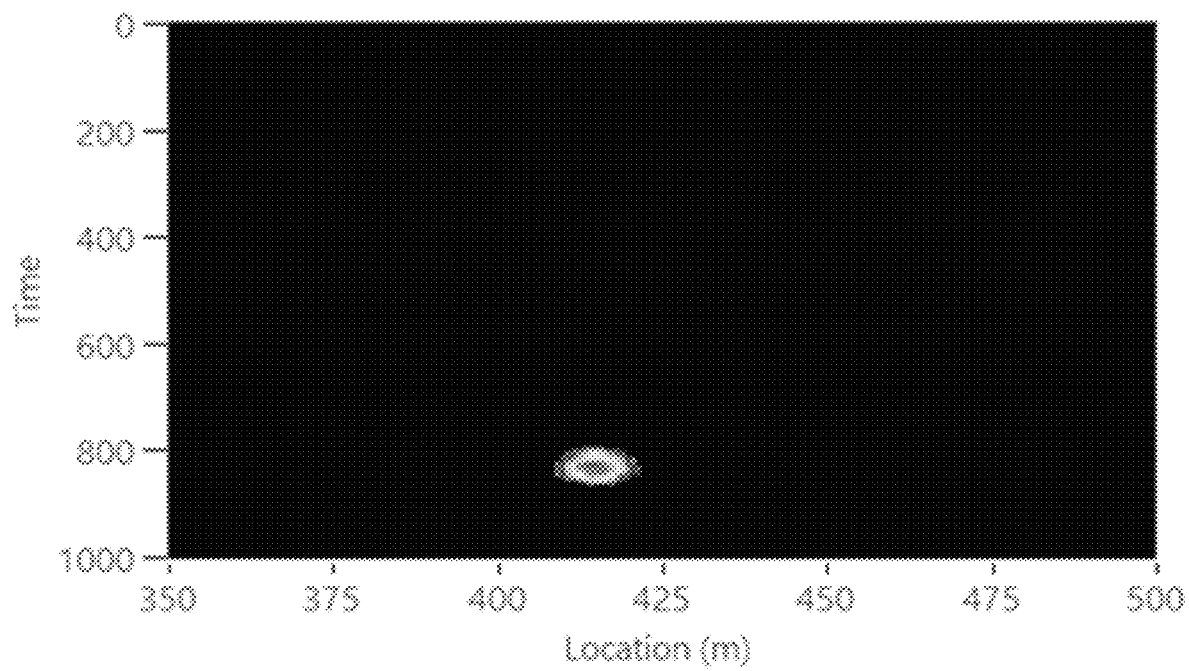
FIG. 7 is a sample waterfall plot after de-noising according to aspects of the present disclosure.
Figure 8:
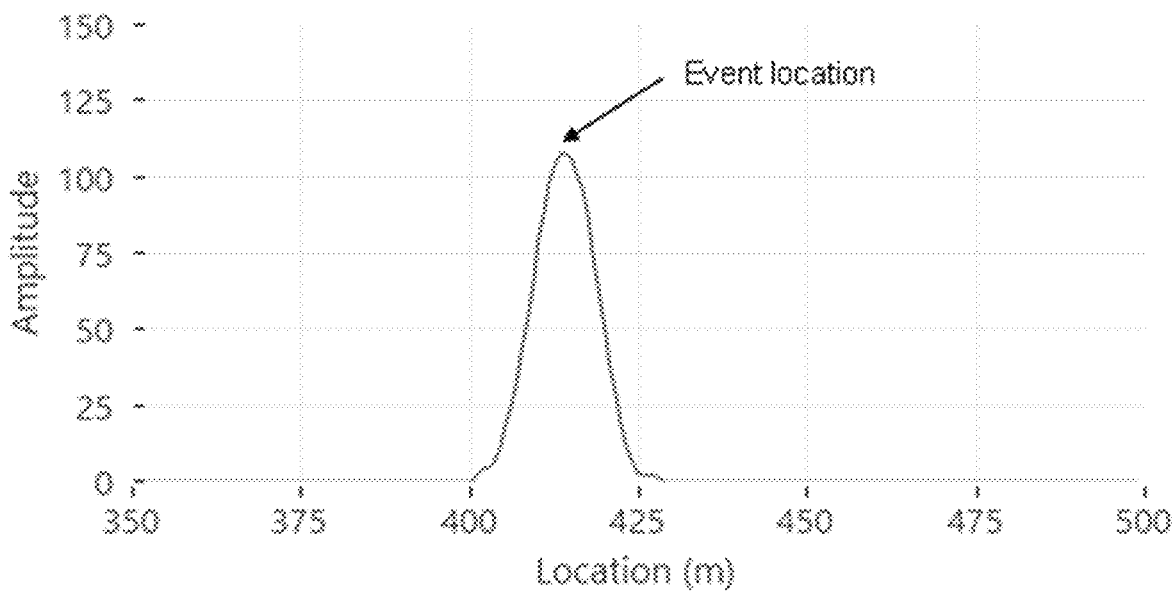
FIG. 8 is a plot illustrative of de-noised data at one instant of time along the optical fiber according to aspects of the present disclosure.
Figure 9:
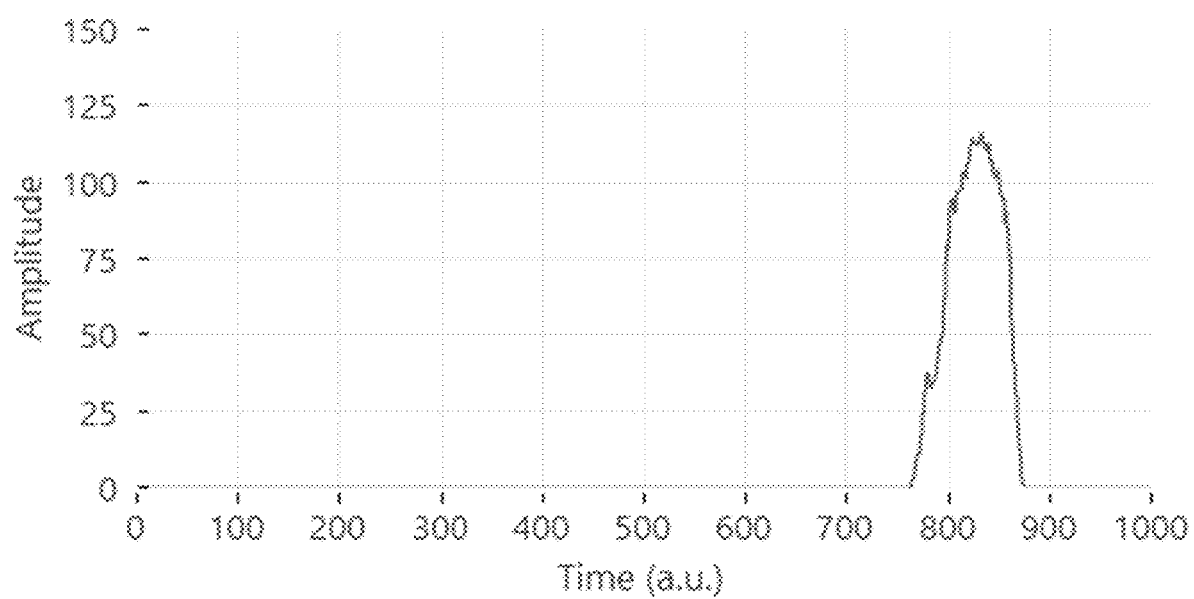
FIG. 9 is a plot illustrative of de-noised data at one instant of time along the optical fiber according to aspects of the present disclosure.

FIG. 7 is the new waterfall plot after performing the de-noising procedure on the original sample data shown in FIG. 2. It can be clearly seen that the new waterfall plot contains much less noise due to this time-space de-noising procedure. The center peak can be clearly observed. FIG. 8 and FIG. 9 are the de-noised result for at the same time and location as FIG. 3 and FIG. 4 respectively. It can be clearly observed that the results are much smoother, displaying bell-curve profiles. As a result, the maximum (event center) can be clearly identified, especially for the location—see FIG. 8. Therefore, in addition to reducing the NAR and increase the POD, our method according to the present disclosure also improves the location accuracy in the distributed sensor.

As shown above, some parameters to be set in this de-noising procedure include the window size (Δx and Δt), and the threshold $W_{th}$. For the space domain window edge (Δx, it can be set based on the location type (e.g. fence, wall, inside tall, directly buried in soil, inside a buried conduit, etc.), the sensing cable characteristics (e.g. outer diameter, jacket material, loose or tight with the buffer layer, any mechanical vibration enhancing element, etc.), the installation method (how it is tied or secured on the location, the spacing between the fasteners, etc.), and the signals to be detected (e.g. light contact, shaking action, vehicle nearby, etc.). It should be set to cover the regions that are associated with the location of interest.

For the time domain window edge Δt, it should be set based on the data refreshing rate (related to data sampling rate, processing time, etc.), the typical event duration, etc. It should be noted that since these 2 dimensions have different physical meanings (location and time) and different characteristics with the sensing event, the values of (Δx and Δt are usually different (this is different from other analysis on a 2-D surface such as analyzing writing patterns, where both axis are for the same physical parameter and are usually interchangeable). For the threshold $W_{th}$, it can be set to better reflect the actual average level between an event and a non-event, without the previous concern about the noise effect.

Since each de-noised value is calculated from the surrounding are on the waterfall plot, the points near the edge (within Δx/2 of both ends of the x-axis and within Δt/2 of both ends of the t-axis) cannot be processed properly, therefore these edge points can be ignored. This should not be an issue, because: for the location axis, usually the beginning section is ignored because it is at the interrogator location and not yet reaching the sensing field, and the ending section are ignored due to termination; for the time axis, ignoring a few rows of data just means that there is a slight delay (most likely less than a second), and will not affect the processing of data and alarm generation.

In our method, the de-noising process for each location at each time only needs to be processed once. In real-time operation, since the original data is rolling down in the waterfall fashion, only the latest data (the top row of the waterfall) need to be processed, since the lower part of the waterfall data have already been processed earlier and stored. Therefore, each time the amount of the de-noising processing is only for one row of data (instead of processing the entire waterfall plot). And since the operation is simple (just threshold counting), it can be done in very short time by any computer with reasonable computation power. Therefore, those skilled in the art will appreciate the low complexity of this procedure and that real-time de-noising is finally achievable, making real-time distributed sensing a practical reality.

Of course, besides real-time application, this procedure can also be used in offline processing of previously recorded data from distributed sensors. Even though it requires the processing of all rows of data, the complexity is still very low, and the required time is short on any normal computer (processing time is usually not an issue in offline processing anyway).

Due to the demonstrated effectiveness in de-noising by our procedure, the resultant de-noised waterfall data are much more linear (proportional) to the physical amplitude of the actual event. As a result, more levels of alarm can be set. For example, different r values can be set for critical alarm, major alarm, and minor alarm respectively, such as 80%, 60% and 45%.

We note that our de-noising method can advantageously interoperate with other data processing methods (such as frequency response analysis, machine learning analysis, etc.) to further improve the sensing performance and deliver more information.

Figure 11:
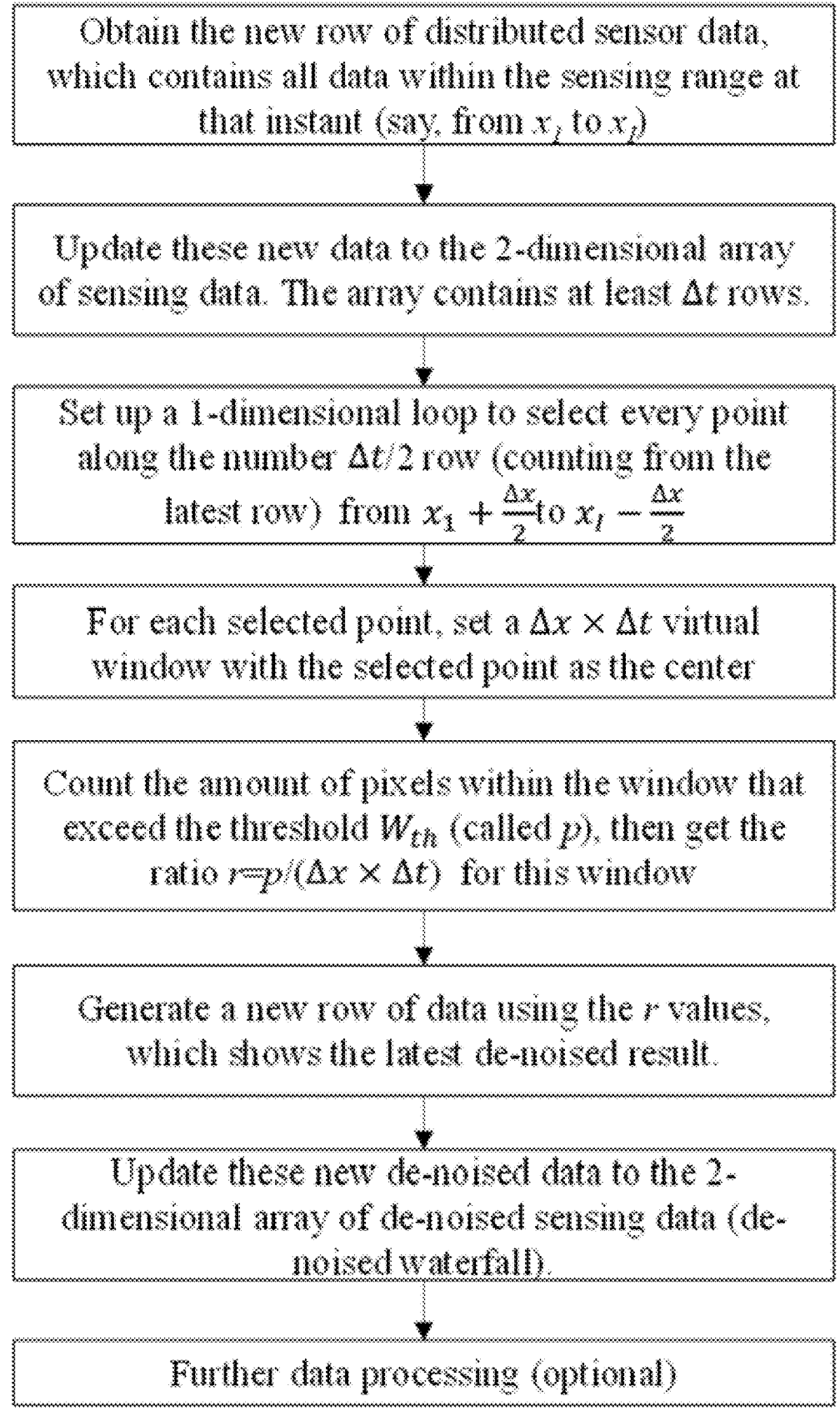
FIG. 11 is a flow chart showing a de-noising procedure in real-time operation according to aspects of the present disclosure.

FIG. 10 is a flow chart of a de-noising procedure according to the present disclosure performed in offline operation. FIG. 11 shows a flow chart of a de-noising procedure according to the present disclosure operating in real-time.

At this point, while we have presented this disclosure using some specific examples, those skilled in the art will recognize that our teachings are not so limited. Accordingly, this disclosure should be only limited by the scope of the claims attached hereto.

The invention claimed is:

1. A computer-implemented method for time-space de-noising of distributed sensor data configured as part of a distributed fiber optic sensing system (DFOS), said system comprising:
   a length of optical sensing fiber;
   a DFOS interrogator in optical communication with the length of optical sensing fiber, said DFOS interrogator;
   said method comprising:
   operating the DFOS interrogator such that a series of optical pulses are directed into the length of optical sensing fiber and back scattering light is received by the DFOS interrogator from the length of optical sensing fiber;
   generating one or more sensor data (waterfall) plots from the received back scattering light; and
   determining physical information at different locations along the length of the optical sensing fiber from the one or more waterfall plots; and
   outputting an indicia of the physical information so determined;
   wherein the waterfall plots include both time domain and spatial domain data;
   wherein the time domain and spatial domain data are simultaneously de-noised;
   wherein waterfall plot data is represented as a 2-dimensional array $W(x_i, t_j)$, where $x_i = x_1, x_2, \ldots, x_I$ and $t_j = t_1, t_2, \ldots t_J$, $x_I$ and $t_J$ are the number of elements in the columns and rows of the waterfall, respectively;
   wherein for each location at each time instant (one point on the waterfall plot called "point-of-interest" or POI), say $(x_{k_o}, t_{l_o})$, a virtual time-space window is selected, with $\Delta x$ points on the space domain (x-axis), and $\Delta t$ points on the time domain (t-axis) and the POI $(x_{k_o}, t_{l_o})$ is at the center;
   the time-space window is represented as $W(x_k, t_l)$, where $$x_k = x_{k_o} - \frac{\Delta x}{2}, \ldots, x_{k_o} + \frac{\Delta x}{2} \text{ and } t_l = t_{l_o} - \frac{\Delta t}{2}, \ldots, t_{l_o} + \frac{\Delta t}{2};$$

and
   within the time-space window, the amount of pixels with sensor data value (the z-axis value) exceeding a threshold ($W_{th}$) is counted, say $p(x_{k_o}, t_{l_o})$, and the minimum value of p is 0, so that none of the pixels within the window exceeds the threshold, and the maximum value of p is $\Delta x \times \Delta t$, indicating that all pixels exceed the threshold; and
   the ratio of p and the window size is then calculated to obtain the percentage ratio r for this POI expressed as:

$$r(x_{k_o}, t_{l_o}) = \sum_{x_k} \sum_{t_l} \frac{f(W(x_k, t_l))}{\Delta x \Delta t} \times 100\%$$

where $$f(W(x_k, t_l)) = \begin{cases} 1, & W(x_k, t_l) \geq W_{th} \\ 0, & W(x_k, t_l) < W_{th} \end{cases}$$

and, the ratio r is output as the de-noised value for a particular location at a particular time instant.

* * * * *